(12) United States Patent
Balan

(10) Patent No.: US 10,113,652 B2
(45) Date of Patent: Oct. 30, 2018

(54) TOP-ENTRY FLOATING BALL VALVE

(71) Applicant: Cameron International Corporation, Houtson, TX (US)

(72) Inventor: Mircea Balan, Moore, OK (US)

(73) Assignee: Cameron International Corporation, Houston, TX (US)

( * ) Notice: Subject to any disclaimer, the term of this patent is extended or adjusted under 35 U.S.C. 154(b) by 114 days.

(21) Appl. No.: 15/169,556

(22) Filed: May 31, 2016

(65) Prior Publication Data

US 2017/0343118 A1 Nov. 30, 2017

(51) Int. Cl.
*F16K 5/06* (2006.01)
*B23P 19/00* (2006.01)

(52) U.S. Cl.
CPC ............ *F16K 5/0636* (2013.01); *B23P 19/00* (2013.01); *F16K 5/0689* (2013.01); *F16K 5/0694* (2013.01); *Y10T 137/0508* (2015.04); *Y10T 137/6045* (2015.04)

(58) Field of Classification Search
CPC .... F16K 5/0636; F16K 5/0689; F16K 5/0694; B23P 19/00; Y10T 137/0508; Y10T 137/6045
USPC .......... 251/214, 315.01–315.316; 137/15.21, 137/315.12, 15.22, 315.21
See application file for complete search history.

(56) References Cited

U.S. PATENT DOCUMENTS

| | | | | |
|---|---|---|---|---|
| 3,037,738 A | * | 6/1962 | Jackson | F16K 5/201 |
| | | | | 251/315.12 |
| 3,038,489 A | * | 6/1962 | Allen | F16K 5/06 |
| | | | | 251/315.12 |
| 3,109,623 A | * | 11/1963 | Bryant | F16K 3/0227 |
| | | | | 251/214 |
| 3,154,094 A | * | 10/1964 | Bredtschneider | F16K 5/0636 |
| | | | | 137/315.21 |
| 3,211,421 A | * | 10/1965 | Johnson, Jr. | F16K 5/0678 |
| | | | | 251/315.12 |

(Continued)

FOREIGN PATENT DOCUMENTS

WO 2014021509 A1 2/2014

OTHER PUBLICATIONS

PCT International Search Report & Written Opinion for PCT application No. PCT/US2017/034722 dated Aug. 17, 2017; 11 Pages.

(Continued)

*Primary Examiner* — John Bastianelli
(74) *Attorney, Agent, or Firm* — Fletcher Yoder P.C.

(57) ABSTRACT

A ball valve includes a body and a ball subassembly. The body includes a first bore extending partially through the body from a first flange of the body along a first axis, the flange defining an opening, a second bore extending in along a second axis from the first bore to a second flange, wherein the second axis is transverse to the first axis, and a third bore extending along the second axis, opposite the second bore, from the first bore to a third flange. The ball subassembly is configured to be inserted into first bore of the body through the opening. The ball subassembly includes a ball having a ball bore extending through the ball. The ball is configured to rotate about the first axis to open and close the ball valve such that the ball bore is substantially aligned with the second axis when the ball valve is open, and wherein the ball bore is substantially transverse to the second axis when the valve is closed.

20 Claims, 11 Drawing Sheets

(56) References Cited

U.S. PATENT DOCUMENTS

| | | | | |
|---|---|---|---|---|
| 3,445,087 | A | * | 5/1969 | Davies ................. F16K 5/0636 251/315.12 |
| 3,488,033 | A | | 1/1970 | Priese |
| 4,792,118 | A | * | 12/1988 | Yusko, Jr. ............. F16K 5/0673 251/214 |
| 5,152,502 | A | | 10/1992 | Randall et al. |
| 5,927,685 | A | * | 7/1999 | Gosling ................ F16K 5/0694 137/312 |
| 6,202,668 | B1 | * | 3/2001 | Maki .................... F16K 5/0694 251/214 |
| 8,500,090 | B2 | | 8/2013 | Hubacek et al. |
| 2006/0196544 | A1 | | 9/2006 | Soderberg et al. |

OTHER PUBLICATIONS

"Memoryseal Resilient-seated Ball Valves Catalog," Velan, Jan. 2014, 44 pages.

* cited by examiner

TOP-ENTRY FLOATING BALL VALVE

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The present disclosure relates to valve assemblies, in particular to a top-entry floating ball valve assembly. A ball valve rotates a ball between an open and a closed position to control fluid flow through the valve. The fluid pressure in a conduit can impact performance and wear of the ball valve. Unfortunately, a higher pressures, the fluid may bias the ball out of a desired operating, thereby potentially causing leakage, wear, and other problems. Accordingly, an improved floating ball valve assembly is disclosed.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Fluids circulated thru various pipelines (e.g., in fluid communication with an oil and gas extraction system) may be at high pressures (e.g., up to 10,000 psi and higher). Accordingly, the control of fluids circulated represents a significant task for a valve assembly.

As discussed in detail below, the disclosed embodiments include a top-entry floating ball valve assembly having substantially aligned (e.g., coaxial) bores and no spring to hold a ball in place, enabling the ball valve to operate at high fluid pressures, without a ball pushing up against the spring and out of position. Furthermore, internal components of the valve may be inserted through an opening in the top of the ball valve without the use of special tools, easing installation and maintenance. Accordingly, the ball valve may be assembled or reassembled (e.g., after maintenance) without removal of the body from upstream and downstream conduits.

Figure 1:
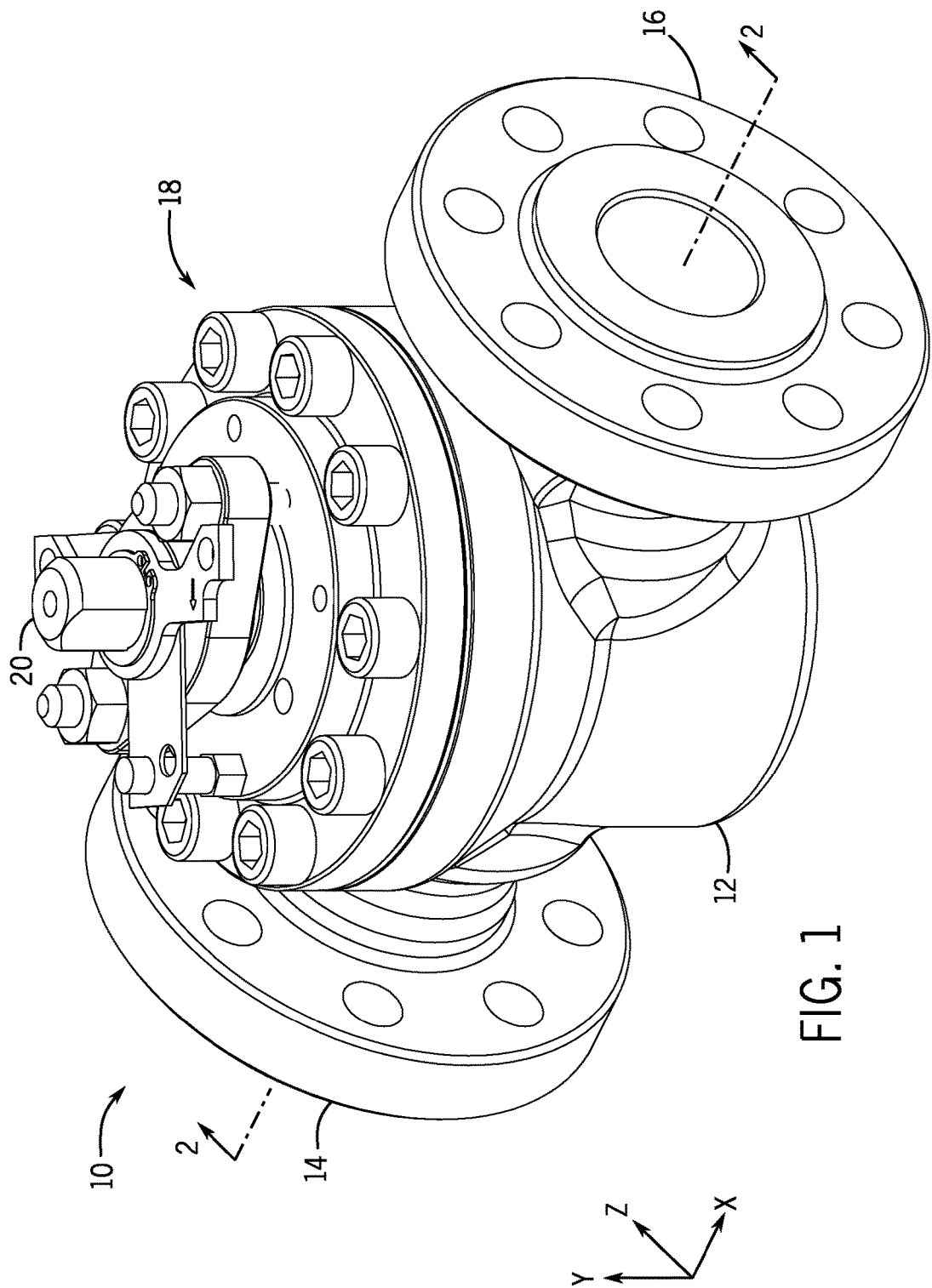
FIG. 1 is a perspective view of an embodiment of a top-entry ball valve.

FIG. 1 is a perspective view of an embodiment of a top-entry ball valve 10. For clarity, an X-axis, Y-axis, and Z-axis are shown. The ball valve 10 includes a body 12. In the illustrated embodiment, the body 12 has a first flange 14 and a second flange 16 disposed on opposite sides of the body 12. The first and second flanges 14, 16 may be coupled to sections of pipe, conduit, elbows, or other fluid flow components having a corresponding flange. Fluid flows through the valve 10 in the X-direction. Fluid may flow through the body 12 of the valve from the first flange 14 to the second flange 16, or from the second flange 16 to the first flange 14. Some embodiments of the ball valve 10 may be configured for one-directional fluid flow (e.g., from the first flange 14 to the second flange 16, or from the second flange 16 to the first flange 14). Other embodiments of the ball valve 10 may be configured for two directional fluid flow (e.g., from the first flange 14 to the second flange 16, and from the second flange 16 to the first flange 14). A ball having a bore may be disposed within the body (see, FIG. 2). The ball may have a bore through it such that as the ball is rotated, fluid flow through the valve 10 is restricted or enabled. A bonnet subassembly 18 may be coupled to the body 12 in order to retain the ball. The bonnet subassembly 18 may be easily removed to access the interior components of the ball valve 10 (e.g., for assembly or maintenance). A stem 20 extends through the bonnet subassembly 18 and interfaces with the ball such that the stem 20 may be rotated to adjust the position of the ball, thus enabling or restricting fluid flow through the valve 10.

Figure 2:
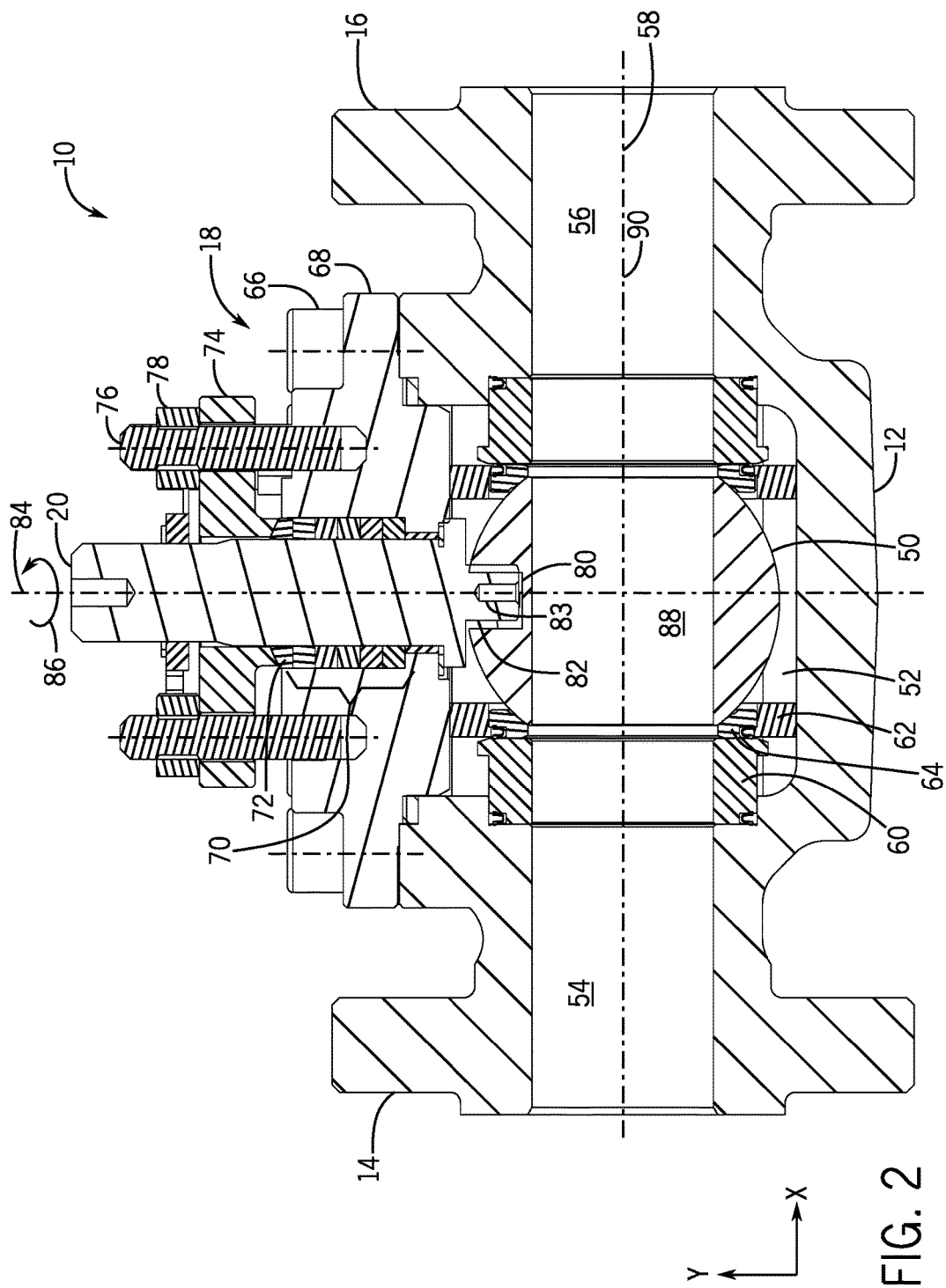
FIG. 2 is a section, side view of an embodiment of the top-entry ball valve shown in FIG. 1, taken long line 2-2.

FIG. 2 is a section, side view of an embodiment of the top-entry ball valve 10 shown in FIG. 1, taken long line 2-2. The ball 50 is disposed within a vertical bore 52 of the body 12. As shown, the body 12 includes a first horizontal bore 54 and a second horizontal bore 56, which extend through the body 12 in the X-direction and allow fluid to flow through the valve 10. It should be understood, however, that horizontal and vertical terms are used merely for convenience and that different orientations may be possible wherein the bores 52, 54, 56 extend along first and second crosswise axes. The first and second horizontal bores 54, 56 are substantially aligned with one another (e.g., coaxial) along an axis 58. Specific characteristics of the body 12 will be discussed in more detail with regard to FIG. 3.

Disposed between the body 12 and the ball 50, on each side of the ball 50, are an annular body bushing 60, an annular seat retainer 62, and an annular seat 64. The body bushing 60, the seat retainer 62, and the seat 64 provide an annular interface with the ball 50 and limit movement of the ball 50 in the X-direction.

The bonnet subassembly 18 couples to the top of the body 12 via bonnet cap screws 66. The bonnet subassembly 18 limits movement of the ball 50 in the Y-direction and facilitates opening and closing of the valve via the stem 20. As illustrated, the bonnet subassembly 18 includes a circular bonnet 68, the generally cylindrical stem 20, an annular packing set 70, an annular packing follower 72, a packing gland 74, studs 76, and nuts 78. The bonnet assembly will be discussed in more detail below with regard to FIG. 7. Additional seals, washers, and miscellaneous components may also be included in the top-entry ball valve 10. The bonnet subassembly may be removed to for access to the interior components of the top-entry ball valve 10 (e.g., for assembly or maintenance) via the vertical bore 52.

The bonnet 68 may be made of carbon steel, stainless steel, titanium, nickel based alloys, or any other suitable material. The bonnet 68 may be cast, forged, machined, molded, 3D printed, made by some other technique, or a combination thereof. The material and/or method of fabrication of the bonnet 68 may or may not match that of the body 12.

In the illustrated embodiment, the ball 50 includes a radial recess 80, which interfaces with a corresponding protrusion 82 (e.g., radial protrusion) at a first end of the stem 20 that extends into the valve 10. The ball 50 and the stem 20 may be coupled to one another by a screw 83. The stem 20 may be rotated (e.g., using a tool) about a vertical axis 84 in a circumferential direction, indicated by arrow 86. As the stem 20 rotates, so too does the ball 50, as a result of the engagement between the recess 80 and the protrusion 82. The ball 50 includes a ball bore 88 extending in the X-direction through the ball 50. In the open position, shown in FIG. 2, the ball bore 88 is substantially aligned with the first and second horizontal bores 54, 56 of the body 12 along a horizontal axis 90. When the ball bore 88 is substantially aligned with the first and second horizontal bores 54, 56, fluid may flow through the valve 10 in the X-direction. As the stem 20 and the ball 50 are rotated in the circumferential direction 86, about the vertical axis 84, the ball bore 88 rotates out of alignment with the first and second horizontal bores 54, 56 such that the overlap between the bores 54, 56, 88, through which fluid may flow, shrinks, restricting fluid flow through the valve 10. When the ball 50 rotates to a point at which there is no overlap between the ball bore 88 and the first and second horizontal bores 54, 56 (e.g., 90 degrees from the position shown in FIG. 2), no fluid may flow through the valve 10.

Figure 3:
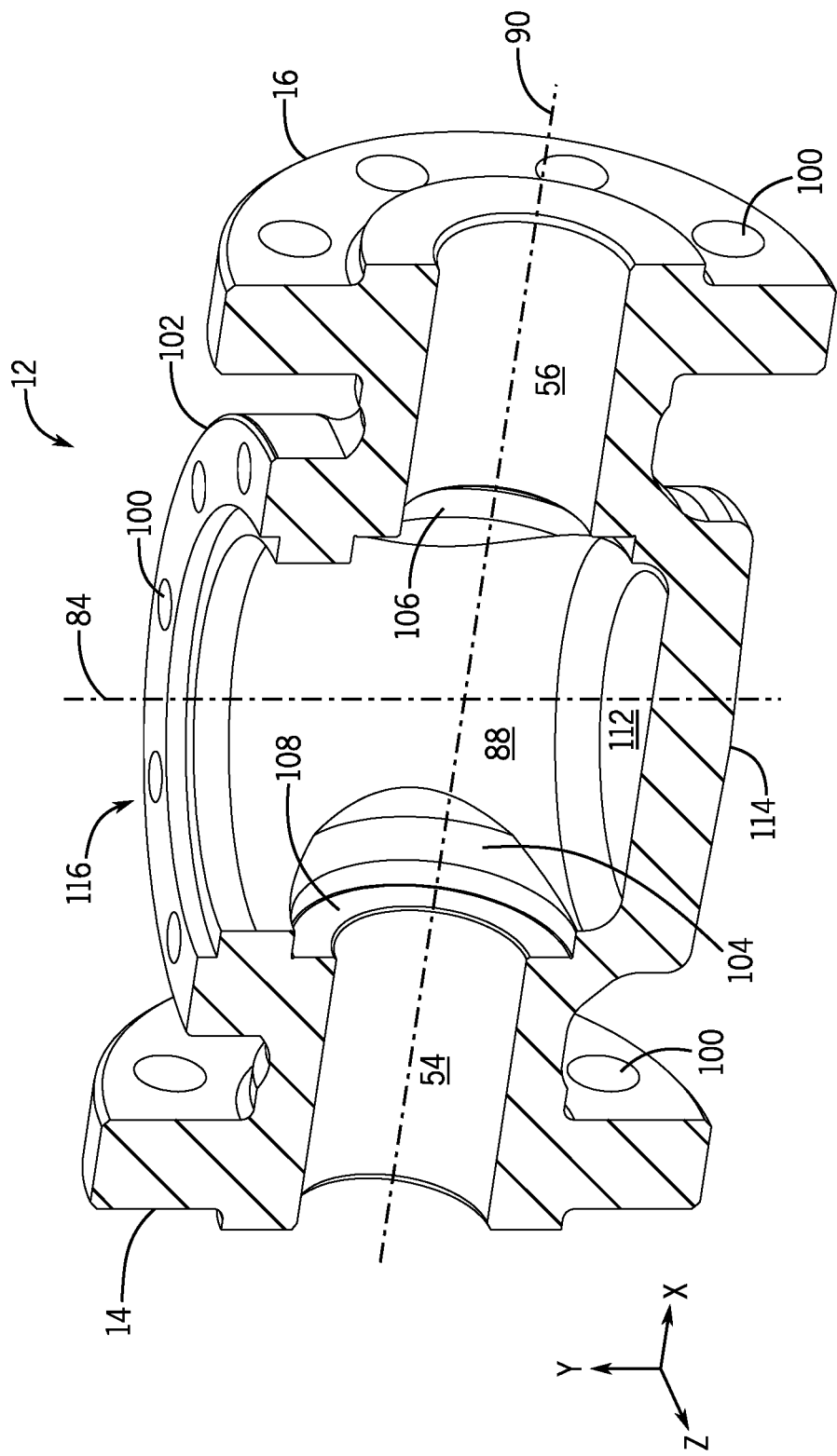
FIG. 3 is a section, perspective view of an embodiment of a body of the top-entry ball valve shown in FIGS. 1 and 2, taken along line 2-2 of FIG. 1.

FIG. 3 is a section, perspective view of an embodiment of the body 12 of the top-entry ball valve 10 shown in FIGS. 1 and 2, taken along line 2-2 of FIG. 1. The body 12 may be made of carbon steel, stainless steel, titanium, nickel based alloys, or any other suitable material. The body 12 may be cast, forged, machined, molded, 3D printed, made by some other technique, or a combination thereof. As previously described, the body 12 has a first flange 14 and a second flange 16, disposed about the axis 90 at opposite ends of the body 12. The first and second flanges 14, 16 include bolt holes 100 for coupling the body 12 to various other fluid flow components (e.g., sections of pipeline, conduits, elbows, other valves, manifolds, etc.). The body 12 illustrated in FIG. 3 also has a top flange 102 having bolt holes 100 for coupling the bonnet 68 to the body 12 (see FIGS. 1 and 2). The bolt holes 100 in the various flanges 14, 16, 102 may be threaded holes (e.g., as shown in the top flange 102) or through holes (e.g., as shown in the first and second flanges 14, 16). If threaded holes are used, threaded fasteners may engage directly with an interior threaded surface of the bolt hole 100 without the use of a nut. If through-holes are used, a fastener may extend through the hole 100, extend through out the back end of the hole 100, and be captured by a threaded nut.

The first and second horizontal bores 54, 56 extend through the body in the X-direction and are aligned with one another along horizontal axis 90, forming an unobstructed characterized cylinder. Each of the first and second horizontal bores 54, 56 includes a respective counterbore 104, 106, forming annular surfaces 108, 110. Each counterbore 104, 106 is substantially aligned with its respective bore 54, 56 such that the bores 54, 56 and counterbores 104, 106 (e.g., annular bores) are substantially coaxial about horizontal axis 90.

The vertical bore 52 extends in the Y-direction partially through the body 12, forming a primary chamber 112. In the illustrated embodiment, the primary chamber 112 is closed at a bottom end 114 and has an opening 116 (e.g., a top-entry opening) opposite the bottom end 114, through which the various internal components of the valve (see FIG. 2) may be inserted into the body 12 during valve assembly. The large cylindrical ball bore 88 enables the interior components of the ball (e.g., the ball 50, the body bushings 60, the seat retainers 62, the seat 64, etc.) to be installed in, or removed from, the body through the opening 116 without detaching the body 12 at the flanges 14, 16. FIGS. 4-9 illustrate assembly of the valve.

Figure 4:
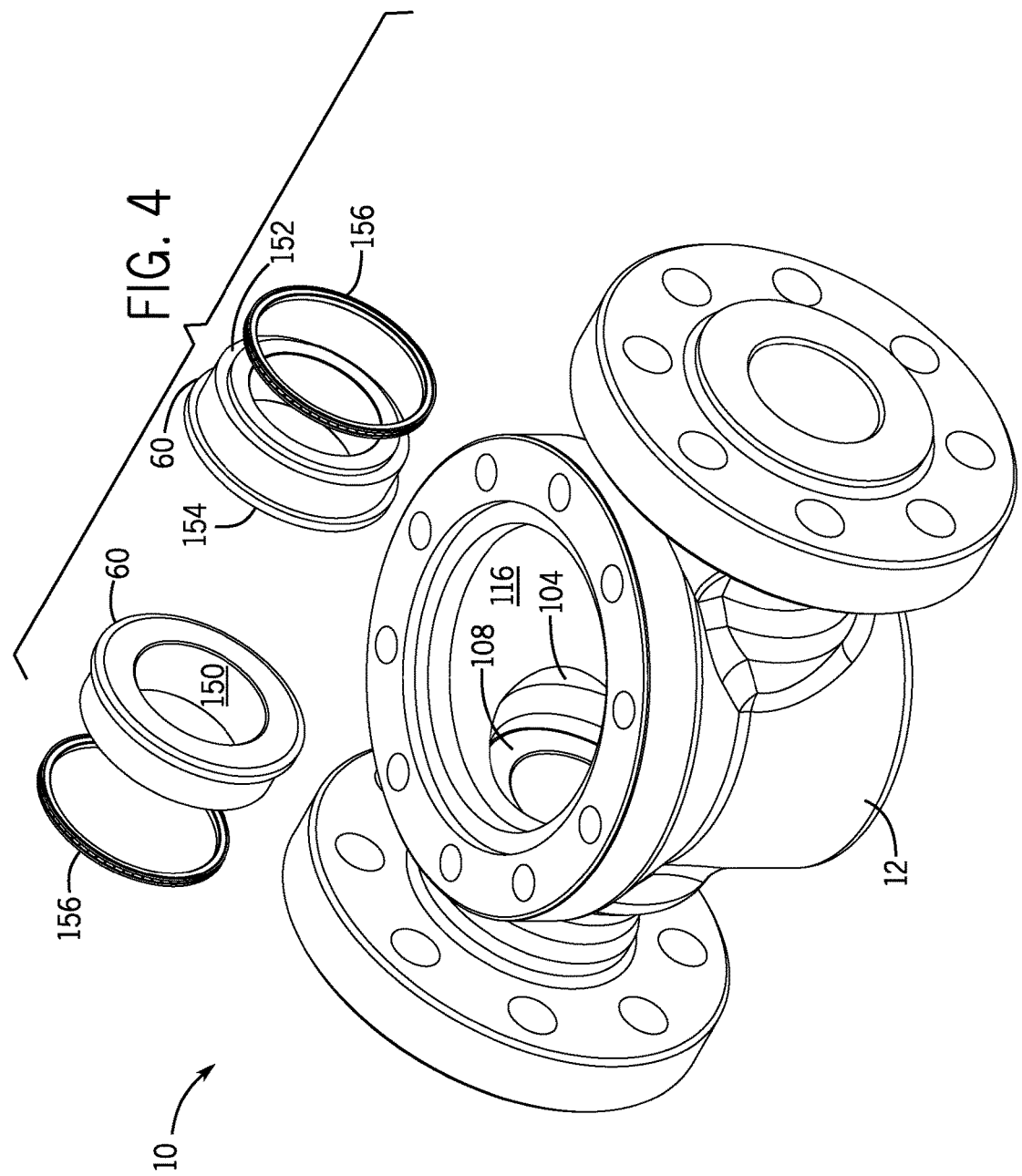
FIG. 4 is an exploded perspective view of an embodiment of the top-entry ball valve during assembly.

FIG. 4 is an exploded perspective view of an embodiment of the top-entry ball the valve 10 during assembly. The body bushings 60 may be made of carbon steel, stainless steel, titanium, nickel based alloys, or any other suitable material. The material of the body bushings 60 may or may not match that of the body 12. As shown, each of the body bushings 60 may be annular in shape, with an interior bore that extends through the body bushing, resulting in a constant interior diameter. In an installed configuration, the body bushings may not protrude into the characterized cylinder formed by the bores 54, 56. Additionally, the body bushing 50 may include an annular recess 152 along the exterior of the body bushing 60 at one end, and a flange 154 at the opposite end. A ring-shaped body bushing seal 156 may be installed on the body bushing 60 by placing the body bushing seal 156 around the body bushing 16 at the recess 152. Each body bushing 60 and body bushing seal 156 may be inserted through the top-entry opening 116 and into the respective counterbore 104, 106 until the body bushing 60 and/or the body bushing seal 156 meets the respective annular surface 108, 110.

Figure 5:
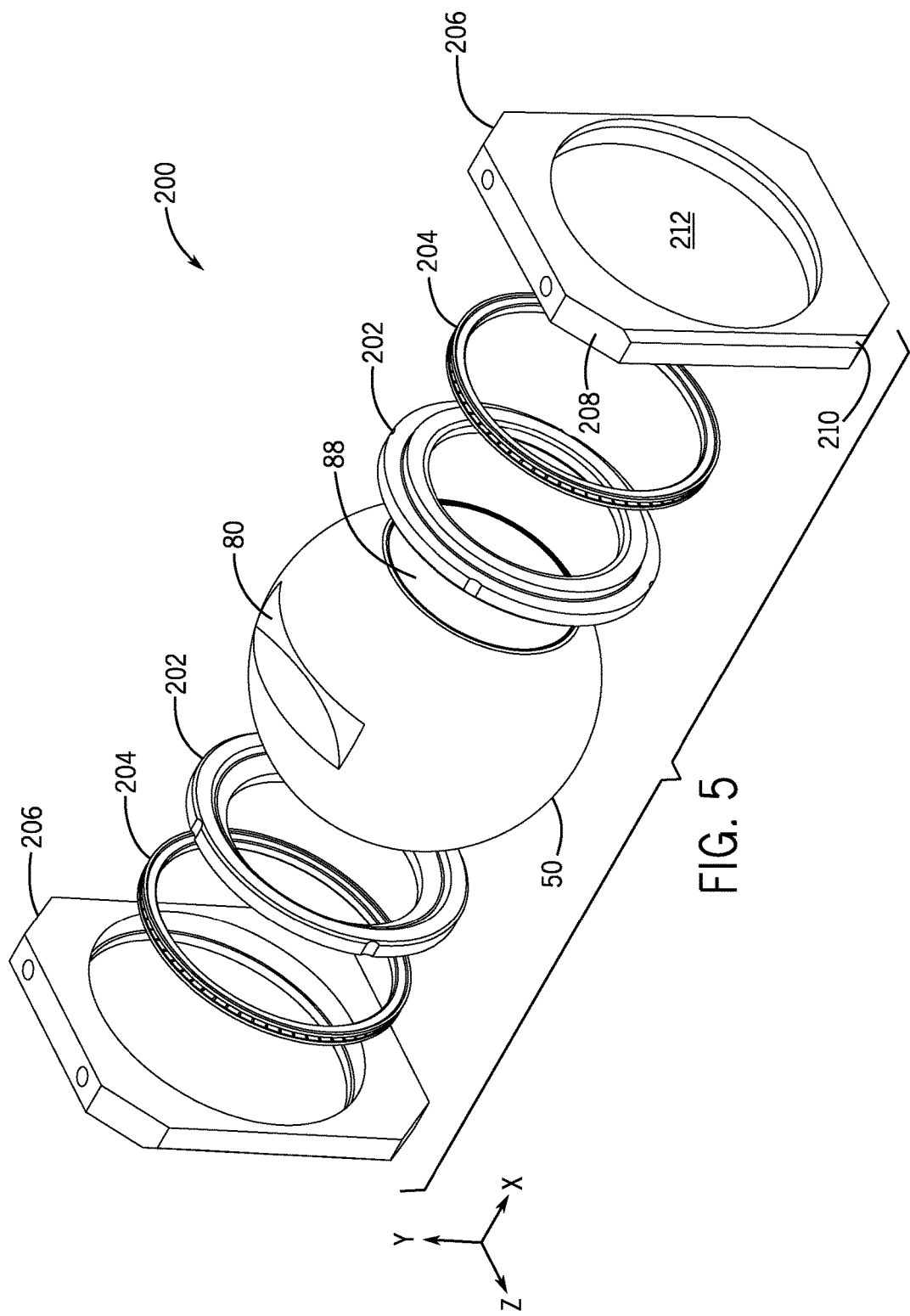
FIG. 5 is an exploded perspective view of an embodiment of a ball subassembly of the top-entry ball valve.

FIG. 5 is an exploded perspective view of an embodiment of a ball subassembly 200 of the top-entry ball valve 10. The illustrated embodiment of the ball subassembly 200 includes the ball 50, two annular seats 202, two annular seat seals 204, and two seat retainers 206. As previously discussed, the ball 50 has the recess 80 extending in the Y-direction from the top of the ball 50, and the ball bore 86 extending in the X-direction through the center of the ball 50.

The seat 202 has an annular structure that is configured to contact the ball 50 when installed. When the ball subassembly 200 is assembled and installed, the seat 202 holds the ball 50 in place, but allows the ball 50 to rotate in order to actuate the valve 10. The seats 202 may be made of metal (e.g., carbon steel, stainless steel, titanium, nickel based alloys, etc.), or of a polymer, such as Teflon, nylon, PEEK, etc. The material of the seats 202 may be selected based on cost, operating fluid pressures, operating fluid temperatures, other considerations, or a combination thereof. In the illustrated configuration, the central hole formed by the seat 202 is substantially aligned with the ball bore 88. As with the body bushings 60 discussed above, the seat retainers 206 and the ball 50 may be made of carbon steel, stainless steel, titanium, nickel based alloys, or any other suitable material. The material of the seat retainers 206 and the ball 50 may or may not match that of the body 12 and/or the body bushings 60. The seat retainer 206 may have a substantially square or rectangular projection in the YZ plane. The seat retainer may have chamfered corners 208 and/or chamfered edges 210 to ease insertion through the opening 116 and installation in the body 12, and a hole 212 through the middle of the seat retainer 206. The hole 212 may be substantially aligned with the ball bore 88 and the corresponding hole through the seat 202. The ring-shaped seat seal 204 may be disposed between the seat 202 and the seat retainer 206 in order to block leakage. During assembly of the ball subassembly 200, the seat seal 204 may be coupled to the seat 202 and then joined to the seat retainer 206, or coupled to the seat retainer 206 and joined to the seat 202. In the open position (shown in FIG. 5), the ball bore 88 is aligned with the holes of the seat 202, the seat seal 204, and the seat retainer 206, allowing fluid to flow through the valve 10. When the ball 50 is rotated (e.g., via the stem 20, as described with regard to FIG. 2) to the closed position (e.g., such that the ball bore 88 is substantially aligned with the Z-direction), the ball bore 88 is not aligned with the holes of the seat 202, the seat seal 204, and the seat retainer 206, and fluid flow through the valve 10 is substantially blocked.

Figure 6:
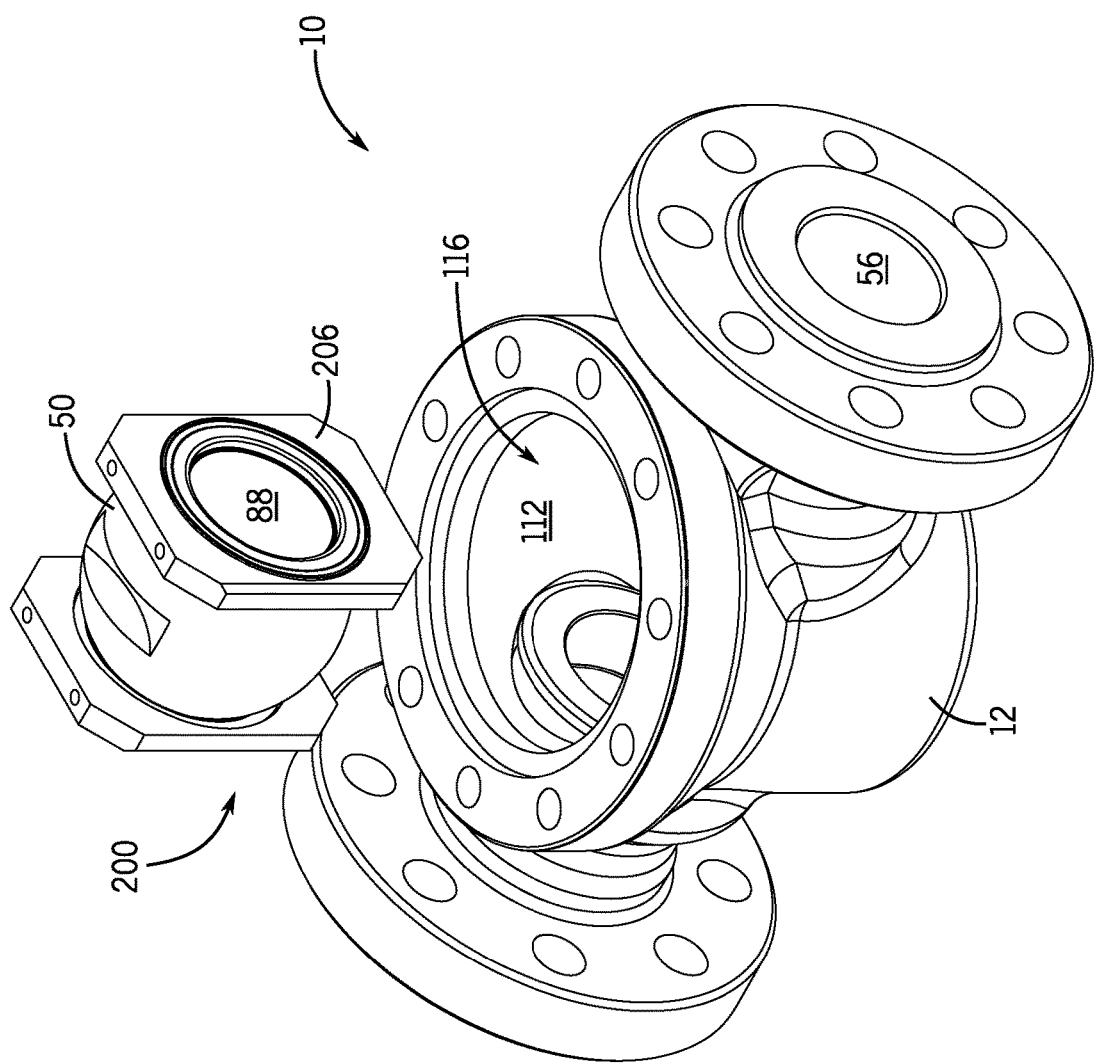
FIG. 6 is a perspective view of an embodiment of the ball subassembly being installed in the body of the top-entry ball valve.

FIG. 6 is a perspective view of an embodiment of the ball subassembly 200 being inserted through opening 116 and installed in the body 12 of the top-entry ball valve 10. As shown in FIG. 6, the ball subassembly 200 and the body 12 are aligned such that the first and second horizontal bores 54, 56 extend in substantially the same direction (e.g., the X-direction) as the ball bore 88. The ball subassembly 200 is then moved in the Y-direction through the opening 116 of the body 12, and into the primary chamber 112 of the body 12, until the seat retainers contact the bottom end 114 of the body (see FIGS. 2-3). When the ball subassembly 200 comes to rest, the ball bore 88 is substantially aligned with the first and second horizontal bores 54, 56, forming an unobstructed cylindrical flow path. The seat retainers 206 may be in contact with the body bushings 60.

Figure 7:
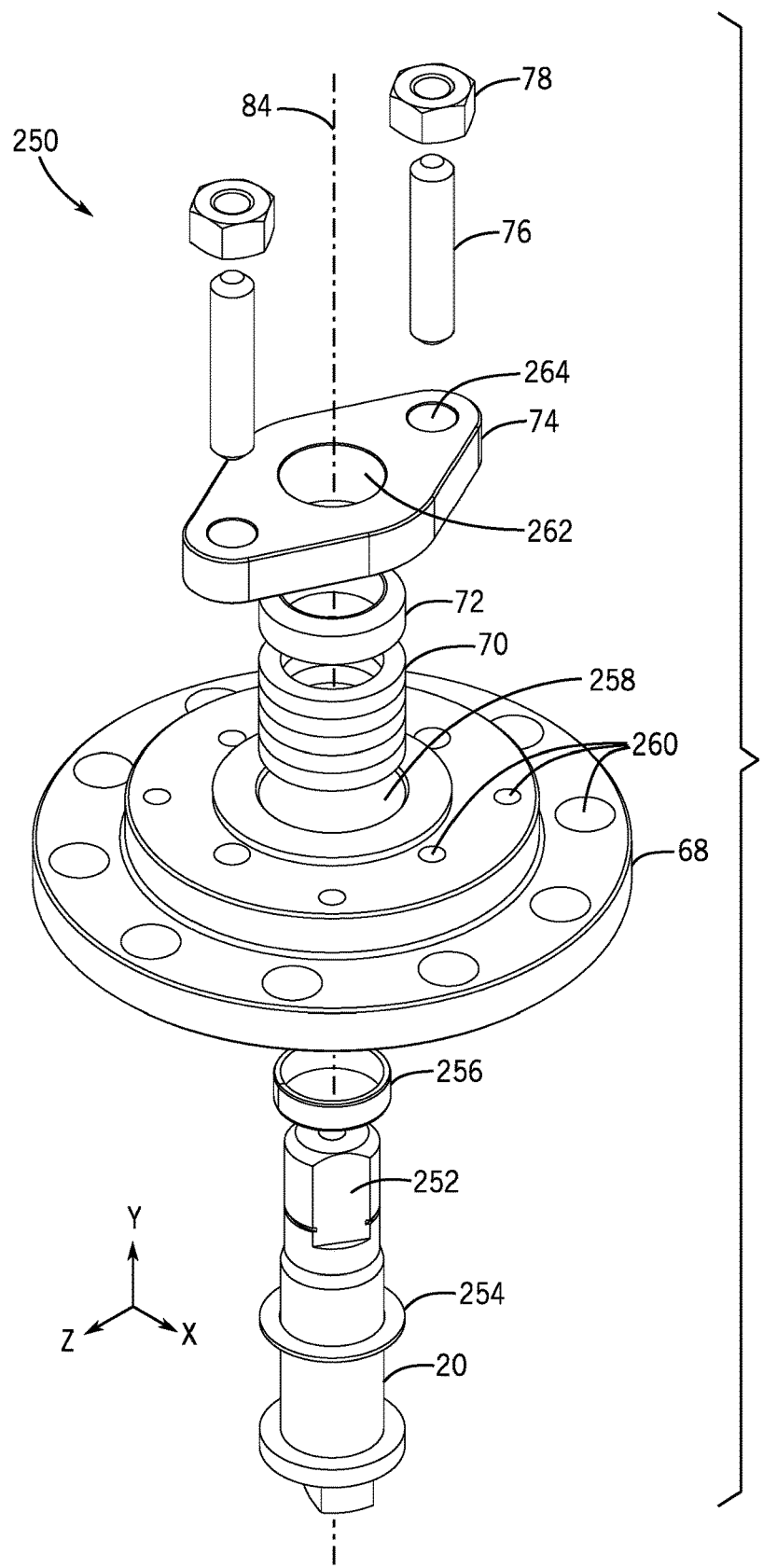
FIG. 7 is an exploded perspective view of an embodiment of a bonnet subassembly of the top-entry ball valve.

FIG. 7 is an exploded perspective view of an embodiment of a bonnet subassembly 250 of the top-entry ball valve 10. As shown in FIG. 7, the stem 20 may be generally cylindrical in shape. The stem may include a number of parallel flat surfaces 252 such that the stem 20 may be gripped and rotated by a tool (e.g., a wrench) in order to actuate the valve 10. In the illustrated embodiment, the stem include two parallel surfaces 252, however, the stem 20 may have 4, 6, 8, 10, 12, or any other number of parallel flat surfaces 252.

As shown, an annular thrust washer 254 and a radial bearing 256 (e.g., annular bearing) may be disposed about the stem 20. Moving up the stem 20 in the Y-direction, the bonnet 68 may be placed over the stem 20 such that the stem 20 extends through a central hole 258 of the bonnet 68. The bonnet 68 also includes various bolt hole 260 patterns used to couple the bonnet 68 to the body 12 and/or to hold various components of the valve 10 in place via pins or bolts. The annular packing set 70 and annular packing follower 72 are disposed radially between the stem 20 and the bonnet 68. The packing set 70 and packing follower 72 form a dynamic seal between the stem 20 and the bonnet 68 that blocks fluid from exiting the valve 10 in the Y-direction as the stem 20 rotates within the bonnet 68. The packing set 70 may be made of graphite, Teflon, or some other polymer. The packing gland 74 rests adjacent to the packing follower 72 along the vertical axis 84 in the Y-direction. Though the packing gland 74 shown in FIG. 7 is generally diamond shaped with radiused corners, the packing gland 74 may be generally circular, triangular, square, pentagonal, hexagonal, octagonal, or any other shape. The packing gland 74 includes a central hole 262 disposed about the vertical axis 84 and configured to receive the stem 20. In the illustrated embodiment, the packing gland 74 includes two bolt holes 264. However, embodiments of the packing gland 74 having 4, 5, 6, 8, 10, 12, or more bolt holes 264 are also envisaged. The packing gland 74 holds the packing set 70 and packing follower 72 in place and is held in place by the threaded studs 76 and threaded nuts 78. As the shape and number of bolt holes 264 in the packing gland change, so too does the number of studs 76 and nuts 78. Accordingly, some embodiments of the bonnet subassembly 250 may include more than two studs 76 and nuts 78.

Figure 8:
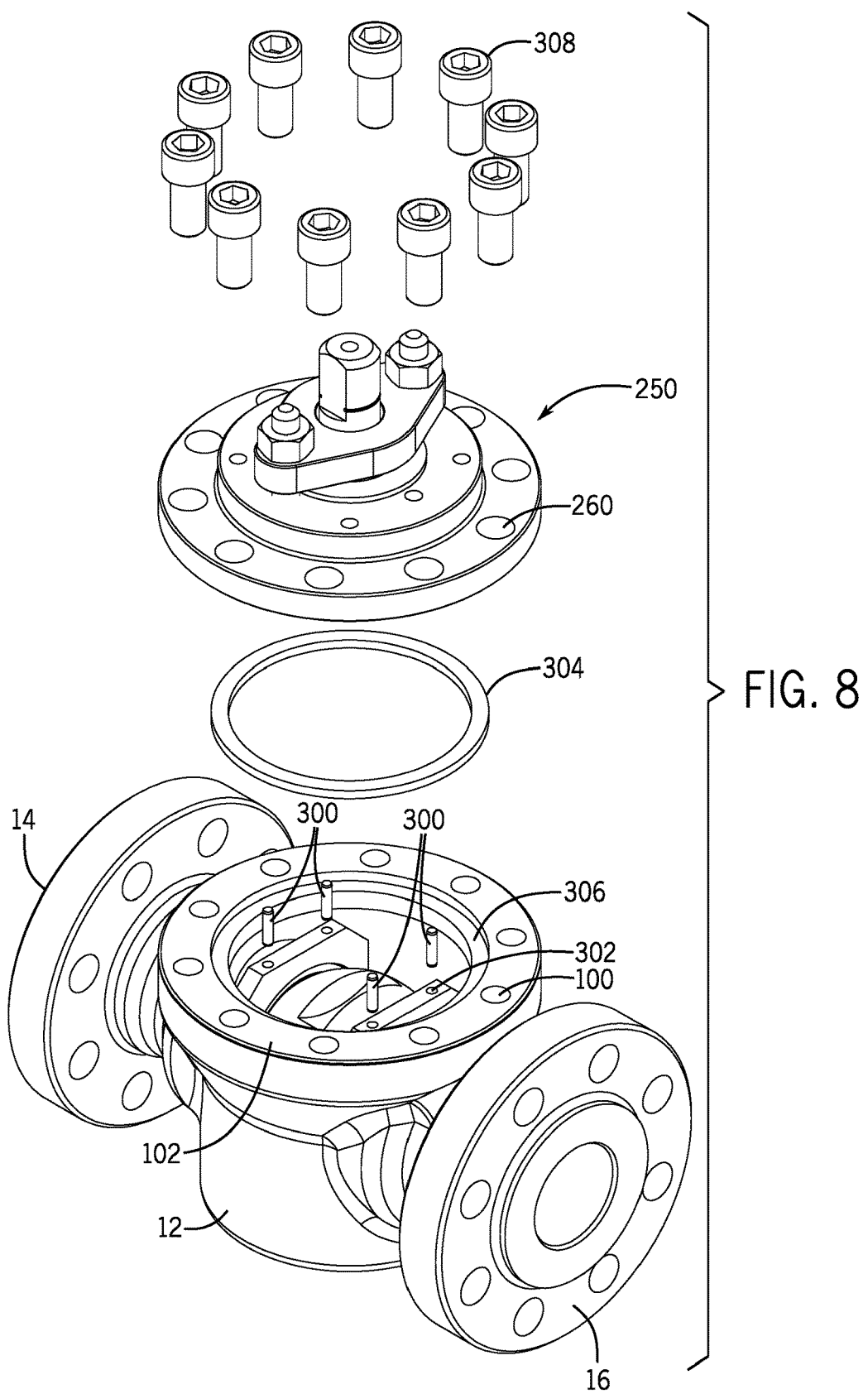
FIG. 8 is an exploded perspective view of an embodiment of the bonnet subassembly being installed on the body of the top-entry ball valve.

FIG. 8 is an exploded perspective view of an embodiment of the bonnet subassembly 250 being installed on the body 12 of the top-entry ball valve 10. As illustrated four torque pins 300 are inserted into four respective holes 302 in a top surface of the seat retainers 206. The torque pins 300 help to align the ball subassembly 200 and the bonnet subassembly 250 relative to one another, and keep them aligned during installation.

An annular bonnet gasket 304 is installed via the opening 116 of the body 12 and laid on an annular lip 306 of the body, just below the top flange 102. In the illustrated embodiment, the bonnet gasket 304 is made of a combination of metal and graphite. However, other suitable gasket materials (e.g., soft metals, polymers, etc.) may be used in other embodiments. The bonnet subassembly 250 may then be laid on top of the bonnet gasket 304 and/or the top flange 102 of the body 12 such that the torque pins 300 align with corresponding holes on the bottom surface of the bonnet and the bolt holes 100 in the top flange 102 of the body align with the bolt holes 260 in the bonnet 68. A set of bonnet cap screws 308 may then be inserted into the bolt holes 260 in the bonnet 68 such that threads of the bonnet cap screws 308 engage with corresponding threads on interior surfaces of the bolt holes 100 in the top flange 102 of the body 12. The bonnet cap screws 308 may be tightened to couple the bonnet subassembly 250 to the body 12, forming a fluid tight seal. As previously discussed above, the bonnet subassembly 250 may be removed for access to the internal components of the top-entry ball valve 10 (e.g., for maintenance or service) without decoupling the top-entry valve 10 at the first and second flanges 14, 16.

Figure 9:
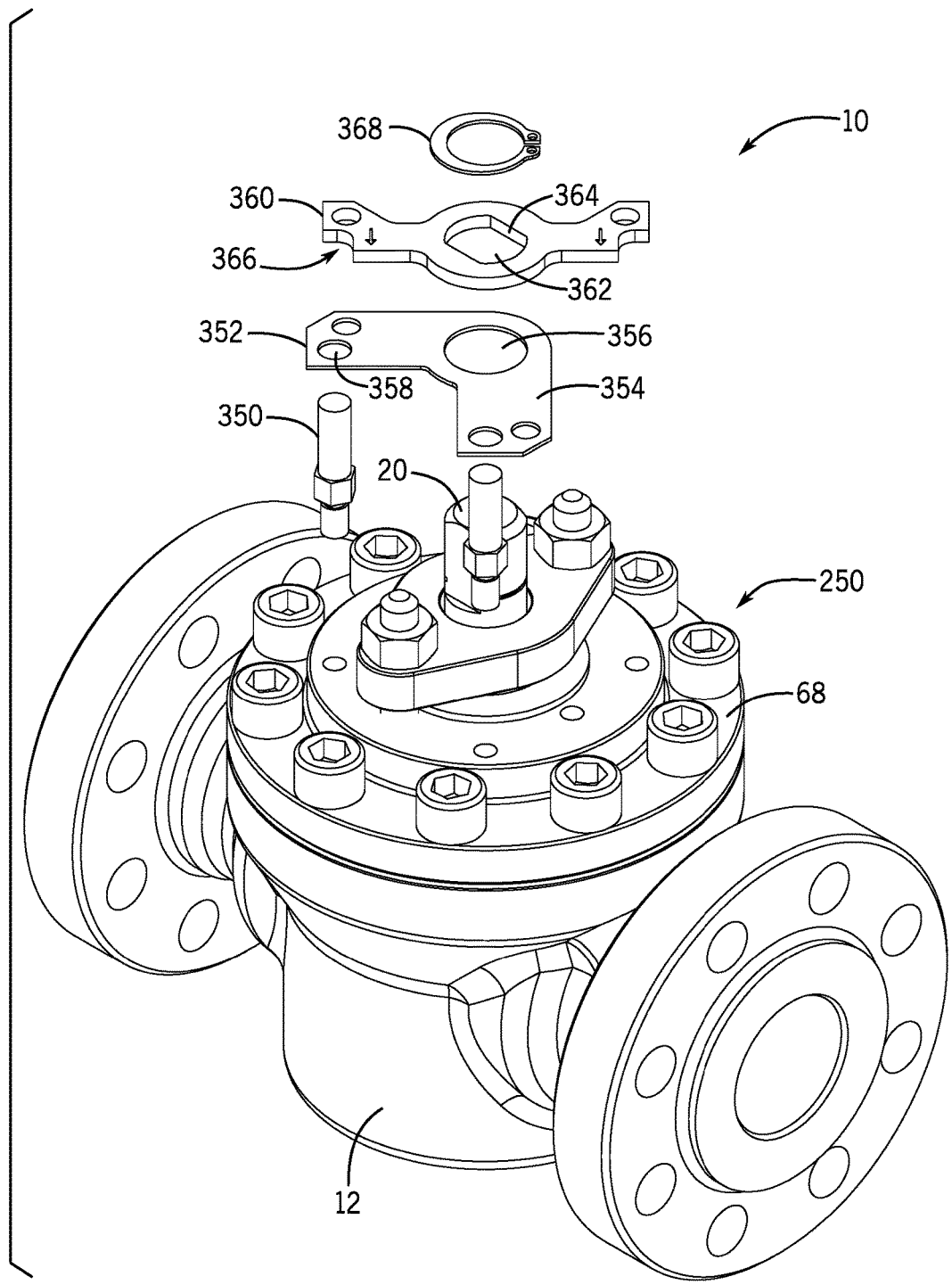
FIG. 9 is an exploded perspective view of an embodiment of the stop pins, lock plate, and stop plate of the top-entry ball valve.

FIG. 9 is an exploded perspective view of an embodiment of the stop pins 350, lock plate 352, and stop plate 360 of the top-entry ball valve 10. As shown, two cylindrical stop pins 350 are inserted into corresponding holes 351 in the bonnet 68. An L-shaped lock plate 352 having two wings 354 and a central hole 356 slips over and around the top of the stem 20, such that the stem 20 extends through the central hole 356. Smaller holes 358 at the distal ends of the wings 354 align with the stop pins 350, such that the stop pins 350 extend through the smaller holes 358 and prevent the lock plate 352 from rotating. A user may install a lock (e.g., a combination lock or key lock) on the lock plate 352 in order to prevent unauthorized actuation of the valve 10.

A stop plate 360 slips over and around the stem 20 and rests on top of the lock plate 352. The stop plate 360 sets the stem 20 rotation angle at the correct open and closed positions, providing a stop at either location, such that a user can determine the position of the valve 10. The stop plate 360 includes a central hole 362 with parallel flats 364 such that the stem 20 extends through the central hole 362 and the parallel flats 364 align with the flat surfaces 252 on the stem 20 (see FIG. 7). The stop plate 360 also includes two recesses 366, which, in an installed configuration, align with the curved exterior surface of the stop pins 350 to provide mechanical stops for the rotation of the stem 20. Finally, a snap ring 368 slips over the stem 20 and rests on top of the stop plate 360, holding the lock plate 352 and stop plate 360 in place.

Reference is made above to seals disposed throughout the valve 10. For example, the seals may include the body bushing seals 156, seat seals 204, etc. These seals 156, 204, and other seals disposed throughout the system, may be made of any metal or polymer which may be appropriate for the intended applications (e.g., pressure, temperature, etc.) of the valve 10.

Embodiments of the top-entry ball valve 10 shown in FIGS. 1-9 are merely some of the embodiments envisaged, and are not intended to be limiting. FIGS. 10-13 illustrate a few example variations of the disclosed embodiments. As with FIGS. 1-9, the embodiments illustrated in FIGS. 10-13 are merely examples, and are not intended to be limiting.

Figure 10:
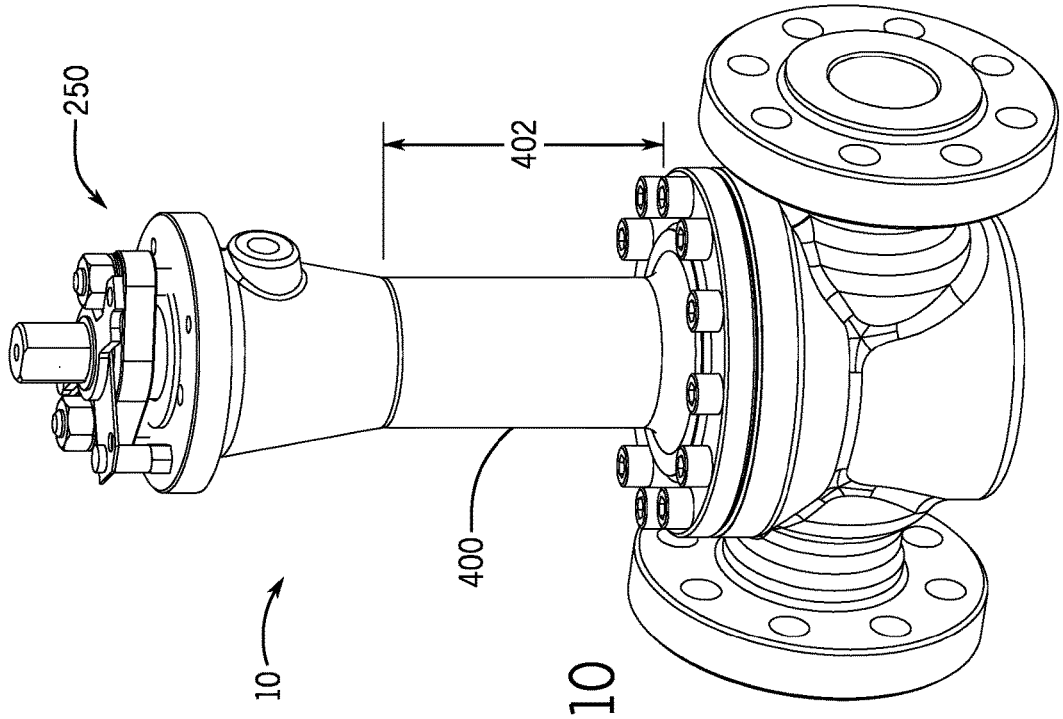
FIG. 10 is a perspective view of an embodiment of the top-entry ball valve having an extended bonnet.

FIG. 10 is a perspective view of an embodiment of the top-entry ball valve 10 having an extended bonnet 400. The extended bonnet 400 may be used in instances where it may be advantageous to actuate the valve 10 at a distance from the body 12. For example, in some applications, the valve 10 may be heavily insulated to maintain a desired fluid temperature through the valve 10. An extended bonnet 400 allows the stem 20 to extend out of the insulation, allowing the valve 10 to be actuated while maintaining insulation around the valve 10, minimizing heat loss. For example, some applications may involve fluids at high temperatures (e.g., more than 250 degrees Fahrenheit). Using insulation and an extended bonnet 400 allow valve 10 actuation while minimizing heat loss. Similarly, when working with low temperature fluids (e.g., less than −20 degrees Fahrenheit), the extended bonnet 400 may be used to increase the temperature at the stem 20 for actuation, while maintaining a low temperature through the valve 10. In other applications, the valve 10 may be insulated to protect the valve 10, even though the temperature of the fluid flowing through the valve 10 may not be particularly high or low. In the illustrated embodiment, the extended bonnet 400 has a height 402 of approximately 10 inches.

Figure 11:
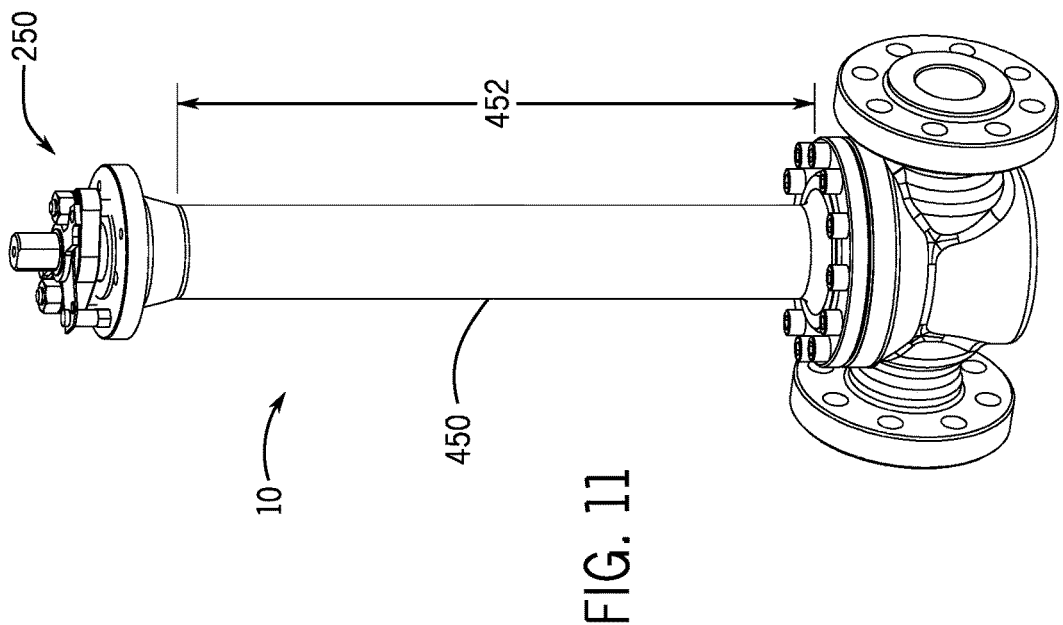
FIG. 11 is a perspective view of an embodiment of the top-entry ball valve having an extended cryogenic bonnet.

FIG. 11 is a perspective view of an embodiment of the top-entry ball valve 10 having an extended cryogenic bonnet 450. Fluid flow through the valve 10 at temperatures less than −90 degrees Fahrenheit (and as low as −400 degrees Fahrenheit) are considered cryogenic. When dealing with cryogenic fluids, there may be national and international standards that specify the length of the bonnet 450 (e.g., 24 inch bonnet for a 2 inch valve). In cryogenic applications, the extended cryogenic bonnet 450 may allow for large temperature differences between the valve 10 and the actuated end of the stem 20 such that the valve body 12 may be at cryogenic temperatures while the actuated end of the stem 20 may be operated with standard protective equipment. In the illustrated embodiment, the extended cryogenic bonnet 450 has a height 452 of approximately 24 inches. However, it should be understood that this is merely an example and that the extended bonnets 400, 450 shown in FIGS. 10 and 11 may be of any height 402, 452. For example, the extended bonnets 400, 450 may have respective heights 402, 452 of equal to or greater than 5 inches, 8 inches, 10 inches, 12 inches, 14 inches, 16 inches, 18 inches, 20 inches, 22 inches, 24 inches, 26 inches, 28, inches 30 inches, 32 inches, 34 inches, 36 inches, or any other desired height.

Figure 13:
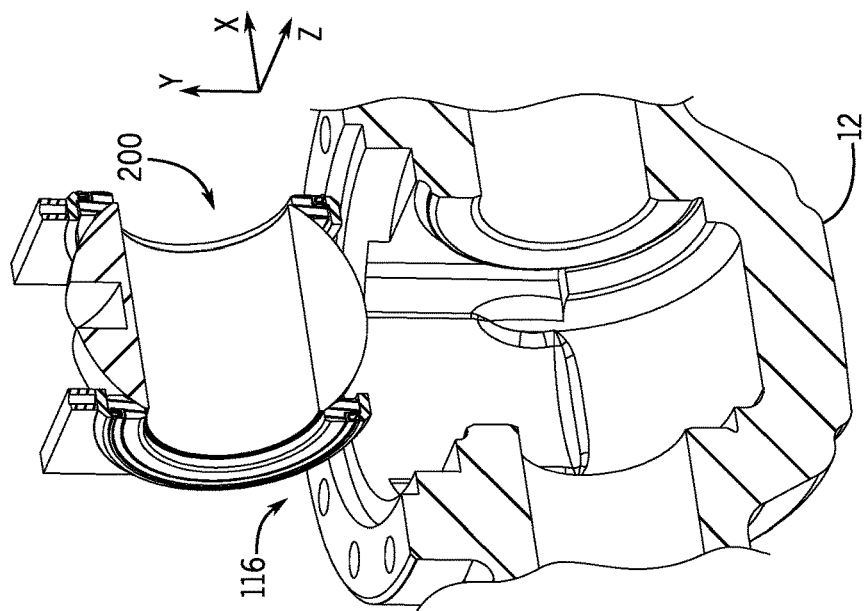
FIG. 13 is a perspective, exploded, section view of installation of the ball subassembly within the body of the top-entry ball valve.
Figure 12:
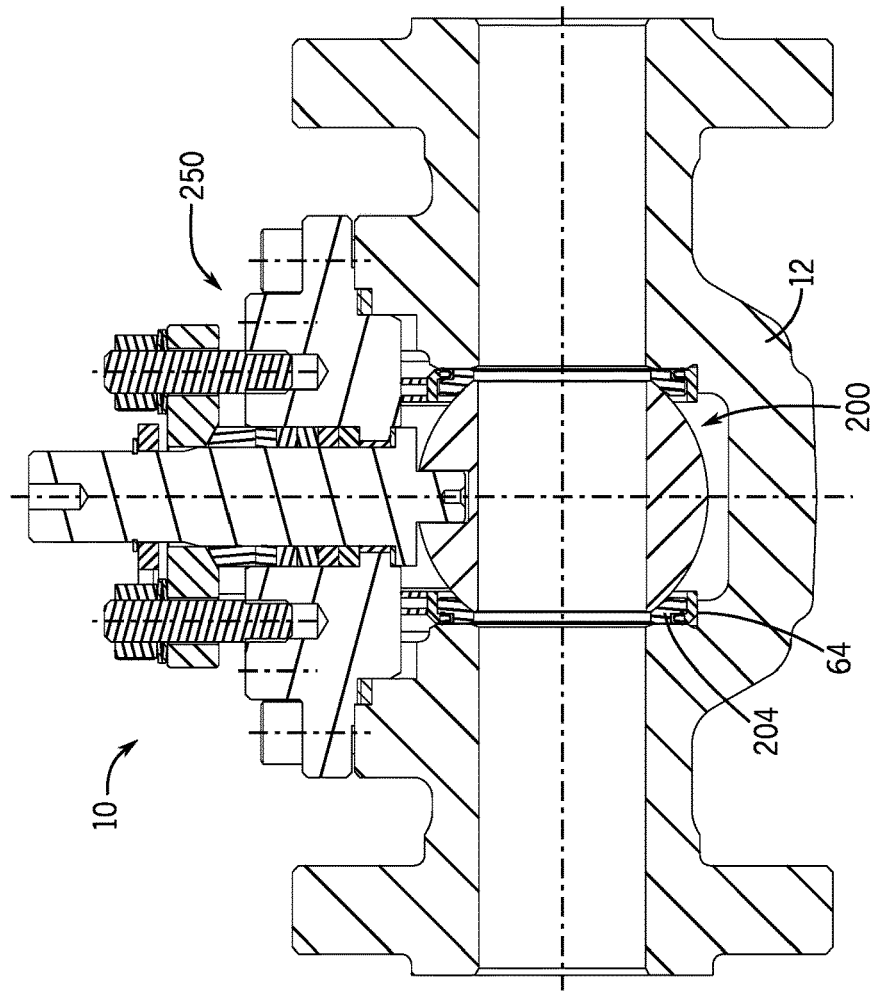
FIG. 12 is a side, section view of an embodiment of the top-entry valve having a cast body.

FIGS. 12 and 13 illustrate an embodiment of the top-entry valve 10 having a cast body 12. FIG. 12 is a side, section view of an embodiment of the top-entry valve 10 having a cast body 12. In the illustrated embodiment, the body 12 lacks the counterbores 104, 106 shown in FIG. 3. Accordingly, the valve 10 lacks the body bushings 60 of the embodiments described above, such that the seat 64 and seat seal 204 contact the body 12. During assembly of the valve, installation of the body bushings 60 and body bushing seals 156 (shown in FIG. 4) may be omitted and the ball assembly 200 installed directly into the body 12.

FIG. 13 is a perspective, exploded, section view of installation of the ball subassembly 200 within the body 12 of the top-entry ball valve 10. As shown, the ball subassembly 200 is moved in the Y-direction, through the opening 116 of the body, and into the primary chamber 112. The bonnet subassembly 250 may then be placed over the ball subassembly 200 and installed as shown and described with regard to FIG. 8. Installation of the stop pins 350, the lock plate 352, the stop plate 360, and the snap ring 369, as described with regard to FIG. 9, remains unchanged. The bonnet subassembly 250 may be removed for access to the internal components of the valve (e.g., ball sub assembly 200) for maintenance or service without decoupling the body 12 from the connected conduits.

The disclosed top-entry valve allows the valve to be assembled via a top opening in the body. Furthermore, the bores through the body and the ball, which are aligned along a horizontal axis, allow the valve to be used at higher pressures than would be possible if the body had tapered bores (e.g., downward tilting bores not aligned with the horizontal axis) and the ball were held in place using a spring.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

The invention claimed is:

1. A method comprising:
   inserting a first body bushing through an opening in a body, into a first bore, and into a first counterbore of a second bore of the body, wherein the first bore extends from a first flange of the body along a first axis, and the second bore extends from the first bore to a second flange of the body along a second axis, transverse to the first axis;
   inserting a second body bushing through the opening in the body, into the first bore, and into a second counterbore of a third bore of the body, wherein the third bore of the body extends along the second axis, opposite the second bore from the first bore to a third flange;
   assembling a ball subassembly, comprising:
      coupling a first seat to a first seat retainer, wherein the first seat is disposed at least partially within a first recess of the first seat retainer;
      coupling a second seat to a second seat retainer, wherein the second seat is disposed at least partially within a second recess of the second seat retainer;
      positioning the first seat and the second seat such that each of the first seat and the second seat contact the ball at respective annular interfaces; and
      wherein the first seat retainer and the second seat retainer are substantially rectangular in shape; and
   inserting the ball subassembly through the opening of the body and into the first bore of the body, between the first and second body bushings, and such that the first seat retainer and the second seat retainer are in contact with a bottom end of the body.

2. The method of claim 1, comprising:
   positioning a bonnet subassembly over the opening of the body; and
   coupling the bonnet subassembly to the body using bolts.

3. The method of claim 2, comprising:
   inserting a first body bushing seal between the body and the first body bushing;
   inserting a second body bushing seal between the body and the second body bushing;
   inserting a first seat seal between the first annular seat and the first seat retainer;
   inserting a second seat seal between the second annular seat and the second seat retainer; and
   inserting a bonnet gasket between the body and the bonnet subassembly.

4. The method of claim 2, wherein the bonnet subassembly comprises:
   an annular bonnet configured to be disposed about a stem;
   a radial bearing disposed radially between the stem and the bonnet;
   a packing set disposed radially between the stem and the bonnet, and disposed adjacent to the radial bearing along the first axis;
   a packing follower disposed radially between the stem and the bonnet, and disposed adjacent to the packing set along the first axis; and
   a packing gland disposed about the stem and adjacent to the packing follower along the first axis.

5. The method of claim 4, wherein the ball comprises a top recess configured to interface with a protrusion of the stem.

6. The method of claim 1, comprising aligning a bore of the ball of the ball subassembly with the first bore and the second bore by positioning the first seat retainer and the second seat retainer in contact with the bottom end of the body.

7. A ball valve comprising:
   a body comprising:
      a first bore extending partially through the body from a first flange of the body along a first axis, the first flange defining an opening;
      a second bore extending in along a second axis from the first bore to a second flange, wherein the second axis is transverse to the first axis; and
      a third bore extending along the second axis, opposite the second bore, from the first bore to a third flange; and
   a ball subassembly, configured to be inserted into the first bore of the body through the opening, comprising:
      a ball comprising a ball bore extending through the ball, wherein the ball is configured to rotate about the first axis to open and close the ball valve such that the ball bore is substantially aligned with the second axis when the ball valve is open and wherein the ball bore is substantially transverse to the second axis when the valve is closed;
      a first seat configured to contact the ball at a first annular interface;
      a first seat retainer comprising a recess configured to receive and support the first seat, wherein the first seat is disposed at least partially within the recess; and
      wherein the first seat retainer is substantially rectangular in shape, and a bottom surface of the first seat retainer is configured to contact a bottom end of the body.

8. The ball valve of claim 7, wherein the ball subassembly comprises a second seat retainer comprising a second recess configured to receive and support a second seat, wherein the second seat is disposed at least partially within the second recess, and wherein the second seat is configured to contact the ball at a second annular interface, opposite the first annular interface.

9. The valve system of claim 8, wherein the substantially rectangular shape of each of the first seat retainer and the second seat retainer is configured to align the ball subassembly with the second bore and the third bore.

10. The ball valve of claim 7, comprising a seat seal disposed at an interface between the first seat and the first seat retainer.

11. The ball valve of claim 7 comprising:
   a bonnet subassembly coupled to the body at the first flange, and covering the opening formed by the first bore; and
   a stem extending through the bonnet subassembly and interfacing with the ball such that rotation of the stem causes rotation of the ball.

12. The ball valve of claim 11, wherein the ball comprises a top recess configured to interface with a protrusion of the stem.

13. The ball valve of claim 11, wherein the bonnet subassembly comprises:
   an annular bonnet configured to be disposed about the stem;
   a radial bearing disposed radially between the stem and the bonnet;
   a packing set disposed radially between the stem and the bonnet, and disposed adjacent to the radial bearing along the first axis;

a packing follower disposed radially between the stem and the bonnet, and disposed adjacent to the packing set along the first axis; and a packing gland disposed about the stem and adjacent to the packing follower along the first axis.

14. A ball valve comprising:

a body comprising:

a first bore extending partially through the body from a first flange of the body along a first axis, the first flange defining an opening;

a second bore extending in along a second axis from the first bore to a second flange, wherein the second axis is transverse to the first axis;

a first counterbore, disposed between the first bore and the second bore, wherein the first counterbore is coaxial to the second bore;

a first annular surface disposed at the intersection of the first counterbore and the second bore;

a third bore extending along the second axis, opposite the second bore, from the first bore to a third flange;

a second counterbore, disposed between the first bore and the third bore, wherein the second counterbore is coaxial to the third bore; and a second annular surface disposed at the intersection of the second counterbore and the third bore;

a ball subassembly, configured to be inserted into the first bore of the body through the opening, comprising:

a ball comprising a ball bore extending through the ball, wherein the ball bore is substantially aligned with the second axis when the ball valve is open, and wherein the ball bore is substantially transverse to the second axis when the valve is closed;

a first seat configured to contact the ball at a first annular interface;

a first seat retainer comprising a recess configured to receive and support the first seat, wherein the first seat is disposed at least partially within the recess; and wherein the first seat retainer is substantially rectangular in shape, and a bottom surface of the first seat retainer is configured to contact a bottom end of the body; and first and second annular body bushings disposed within the first and second counterbores, respectively, and disposed between the body and the ball.

15. The ball valve of claim 14, wherein the first seat is disposed between the ball and the first annular body bushing.

16. The ball valve of claim 14, wherein the first seat retainer comprises a central bore and chamfered corners.

17. The ball valve of claim 14, comprising:

a bonnet subassembly coupled to the body at the first flange, and covering the opening formed by the first bore; and a stem extending through the bonnet subassembly and interfacing with the ball such that rotation of the stem causes rotation of the ball.

18. The ball valve of claim 17, wherein the ball comprises a top recess configured to interface with a protrusion of the stem.

19. The ball valve of claim 17 comprising:

a first body bushing seal disposed between the first body bushing and the first annular surface;

a second body bushing seal disposed between second body bushing and the second annular surface;

a first seat seal disposed between the first seat and the first seat retainer;

a second seat seal disposed between the second seat and the second seat retainer; and a bonnet gasket disposed between the body and the bonnet subassembly.

20. The ball valve of claim 17, wherein the bonnet subassembly comprises:

an annular bonnet configured to be disposed about the stem;

a radial bearing disposed radially between the stem and the bonnet;

a packing set disposed radially between the stem and the bonnet, and disposed adjacent to the radial bearing along the first axis;

a packing follower disposed radially between the stem and the bonnet, and disposed adjacent to the packing set along the first axis; and a packing gland disposed about the stem and adjacent to the packing follower along the first axis.

* * * * *